(12) United States Patent
Cho et al.

(10) Patent No.: US 10,816,760 B2
(45) Date of Patent: Oct. 27, 2020

(54) MINIATURE CAMERA MODULE

(71) Applicant: Spring Rainbow Optics Co., LTD, Taoyuan (TW)

(72) Inventors: Hung-Chang Cho, Taoyuan (TW); Yu-Teng Jheng, Changhua County (TW)

(73) Assignee: SPRING RAINBOW OPTICS CO., LTD, Taoyuan (TW)

( * ) Notice: Subject to any disclaimer, the term of this patent is extended or adjusted under 35 U.S.C. 154(b) by 0 days.

(21) Appl. No.: 16/419,059

(22) Filed: May 22, 2019

(65) Prior Publication Data

US 2019/0361200 A1 Nov. 28, 2019

Related U.S. Application Data

(60) Provisional application No. 62/675,867, filed on May 24, 2018.

(51) Int. Cl.
| | |
|---|---|
| *G02B 13/00* | (2006.01) |
| *H04N 5/225* | (2006.01) |
| *G02B 1/04* | (2006.01) |
| *G02B 13/06* | (2006.01) |
| *G02B 7/02* | (2006.01) |

(52) U.S. Cl.
CPC ......... *G02B 13/0015* (2013.01); *G02B 1/041* (2013.01); *G02B 7/021* (2013.01); *G02B 13/06* (2013.01); *H04N 5/2254* (2013.01); *H04N 5/2257* (2013.01)

(58) Field of Classification Search
CPC .... G02B 13/0015; G02B 1/041; G02B 13/06; G02B 7/021; H04N 5/2257; H04N 5/2254; H04N 5/2256
See application file for complete search history.

(56) References Cited

U.S. PATENT DOCUMENTS

| | | | | |
|---|---|---|---|---|
| 5,701,015 | A * | 12/1997 | Lungershausen | G03B 15/05 250/494.1 |
| 7,576,401 | B1 * | 8/2009 | de Guzman | G02B 7/021 257/234 |
| 8,730,383 | B2 * | 5/2014 | Burrell | H04N 5/2256 348/371 |
| 9,140,826 | B2 * | 9/2015 | Miyazaki | G02B 3/00 |
| 10,469,770 | B2 * | 11/2019 | Jung | H04N 5/2256 |
| 10,591,648 | B2 * | 3/2020 | Ramones | H04N 5/2256 |
| 2002/0154239 | A1 * | 10/2002 | Fujimoto | G02B 7/022 348/340 |
| 2005/0237415 | A1 * | 10/2005 | Kong | G02B 7/022 348/335 |

(Continued)

Primary Examiner — Timothy J Henn
(74) Attorney, Agent, or Firm — WPAT, PC (57) ABSTRACT

A camera module is provided and includes a lens assembly and an illuminating module. The lens assembly includes a plurality of lenses and a lens barrel disposed around the lenses for supporting the lenses. The lens assembly includes an incident surface, an emergent surface and a lateral surface. The lens barrel includes a bearing part parallel to the lenses, and the bearing part is disposed on the emergent surface of the lens assembly and is not disposed on the incident surface of the lens assembly. The illuminating module includes at least one light source and an annular circuit board, and disposed on the incident surface of the lens assembly.

18 Claims, 6 Drawing Sheets

(56) References Cited

U.S. PATENT DOCUMENTS

| | | | |
|---|---|---|---|
| 2010/0039253 A1* | 2/2010 | Zang | G08B 25/009 340/539.1 |
| 2010/0079591 A1* | 4/2010 | Lee | H04N 5/2256 348/143 |
| 2012/0257095 A1* | 10/2012 | Velazquez | H04N 5/2354 348/333.01 |
| 2019/0094662 A1* | 3/2019 | Houjou | A61B 1/24 |
| 2019/0216325 A1* | 7/2019 | Ouyang | A61B 1/307 |

* cited by examiner

MINIATURE CAMERA MODULE

CROSS REFERENCE TO RELATED APPLICATIONS

The present application claims the benefit of priority under 35 USC 119(e) of U.S. Provisional Patent Application No. 62/675,867 entitled "MINIATURE IMAGING MODULE" and filed on May 24, 2018, the contents of which are incorporated herein by reference in their entirety.

FIELD OF INVENTION

The present disclosure relates to the technical field of cameras, and particularly to a miniature camera module with a wide viewing angle.

BACKGROUND OF DISCLOSURE

Figure 1:
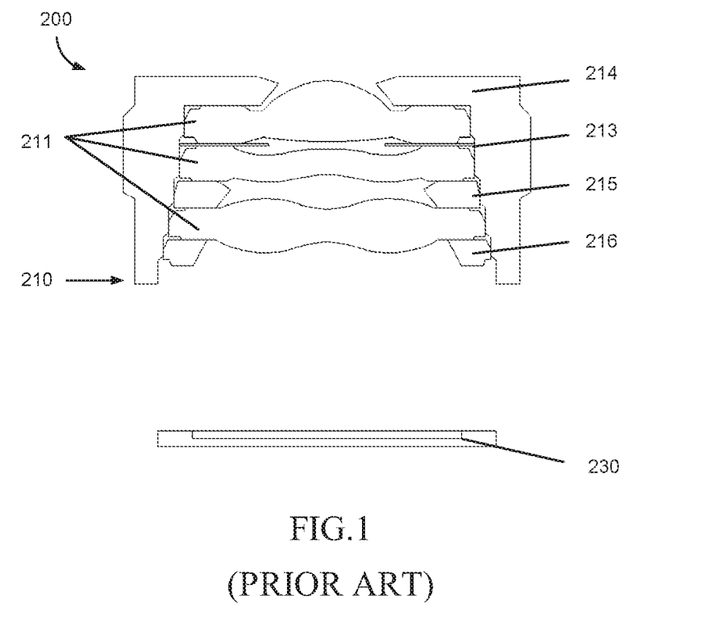
FIG. 1 is a cross-sectional side view illustrating a common camera module.

A common camera module mainly includes a lens assembly 210 and an image sensor 230, as shown in FIG. 1. The lens assembly 210 further includes a lens barrel 212, a lens 211, and a light shielding film 213 (e.g. obtained from Mylar® or Soma®), a spacer 215, a rear cover 216 (or known as a retainer) and other components. A common design is that a bearing part 214 of the lens barrel 212 is located near a lens farthest away from the image sensor 230 to facilitate assembling the components into a compact module.

In certain applications, such as an endoscope, the camera module 200 must be miniaturized and illuminated to meet requirements. Because a common endoscope cannot clearly show the to-be-observed object in a dark environment, proper illumination is required for a user to clearly know where the wall of the flexible tube of the endoscope is located during the dynamic video recording, move the flexible tube to an observation place, and properly illuminate the to-be-observed object for brightening the image and making the image clear, thereby facilitating the image capture for determination and analysis.

However, when the illuminating function is realized, the structure of the camera module is not easily miniaturized, and the viewing angle may be narrowed. The details are as shown in FIG. 2 to FIG. 4.

Figure 2:
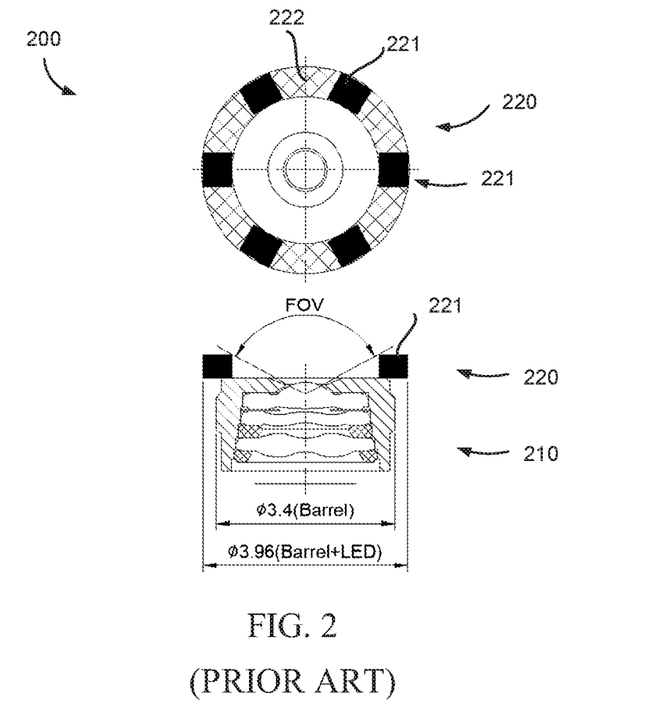
FIG. 2 is a cross-sectional side view and a top view illustrating a conventional camera module having an illuminating module.

As shown in the upper part of FIG. 2, an illuminating module 220 includes a plurality of illuminating parts 221 and an annular circuit board 222. The illuminating parts 221 are loaded on the annular circuit board 222. The illuminating parts 221 may be light emitting diodes (LEDs). The annular circuit board 222 may be a flexible circuit board (or flexible printed circuit, FPC). If so, the design can also be referred to as an annular LED illuminating module 220.

In the first common structure, the annular LED illuminating module 220 is loaded on a front end of the camera module 200. In order to prevent the reduction of the field of view (FOV), the outer diameter (OD) of the entire module 220 must be increased. For example, if no annular LED illuminating module 220 is loaded, the outer diameter of the entire module 200 is 3.4 mm, but if the annular LED illuminating module 220 is loaded, the outer diameter of the entire module 200 is 3.9 mm. Therefore, the design does not achieve the purpose of miniaturization.

Figure 3:
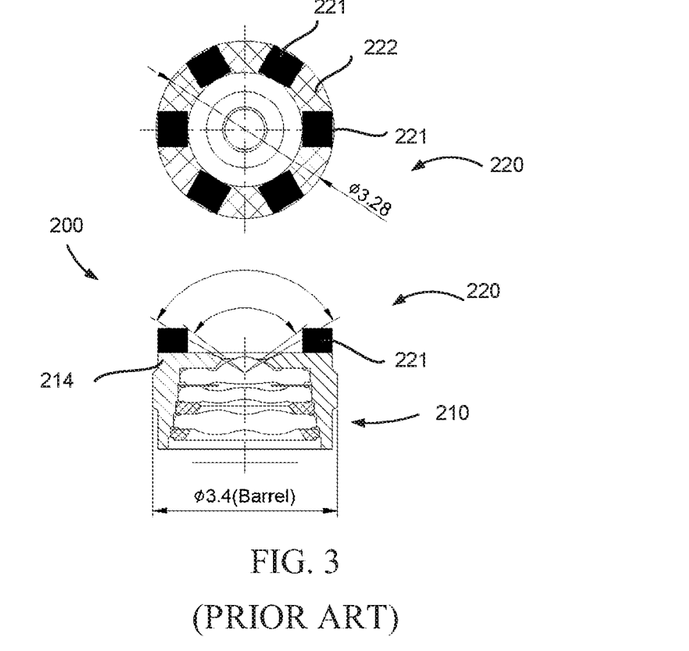
FIG. 3 is a cross-sectional side view and a top view illustrating another conventional camera module having an illuminating module.
Figure 4:
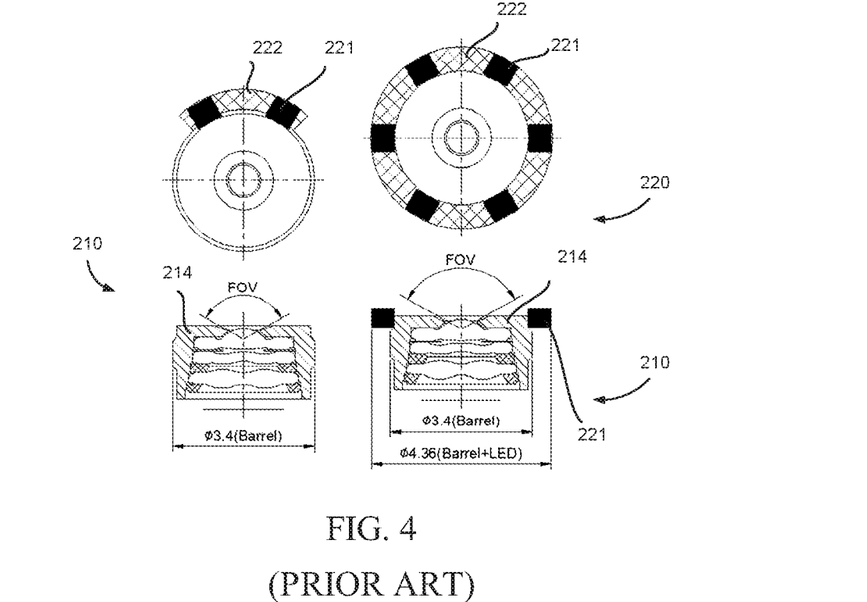
FIG. 4 is a cross-sectional side view and a top view showing yet another conventional camera module having an illuminating module.

As shown in FIG. 3, in terms of an annular LED illuminating module 220 loaded on the front end of the camera module 200, in order to reduce the outer diameter of the entire module 200, the field of view (FOV) is reduced, and the wide viewing angle requirement is not met.

As shown in FIG. 4, in another common structure, the annular LED illuminating module 220 is loaded onto the lateral side of the camera module 200. In this way, in spite of no issue of reducing the viewing angle, the outer diameter of the entire module 200 is necessarily increased. For example, if no annular LED illuminating module 220 is loaded, the outer diameter of the entire module 200 is 3.4 mm, but if the annular LED illuminating module 220 is loaded, the outer diameter of the entire module 200 is 4.36 mm (a complete annular LED illuminating module is loaded, as shown in the right part in FIG. 4), or 3.88 mm (a partial annular LED illuminating module is loaded, as shown in the left part in FIG. 2C). Therefore, the design does not easily achieve the purpose of miniaturization.

Therefore, it is necessary to provide a miniature camera module with a wide viewing angle for solving the problem of the prior art.

SUMMARY OF INVENTION

A primary object of the present disclosure is to provide a miniature camera module with a wide viewing angle.

To achieve the above object, an aspect of an embodiment of the present disclosure provides a camera module including:

a lens assembly including a plurality of lenses and a lens barrel disposed around the lenses for supporting the lenses, wherein the lens assembly includes an incident surface, an emergent surface and a lateral surface;

wherein the lens barrel includes a bearing part parallel to the lenses, and the bearing part is disposed on the emergent surface of the lens assembly and is not disposed on the incident surface of the lens assembly; and an illuminating module including at least one light source and an annular circuit board, and disposed on the incident surface of the lens assembly.

In accordance with an embodiment of the present disclosure, a part of the illuminating module is disposed on a part of a surface of one of the lenses closest to the incident surface, and the part of the surface is adjacent to a circumference of the lens closest to the incident surface.

In accordance with an embodiment of the present disclosure, a part of the illuminating module is disposed in a mounting recess of one of the lenses closest to the incident surface, and the mounting recess is adjacent to a circumference of the lens closest to the incident surface.

In accordance with a further embodiment of the present disclosure, an angle between a side wall and a bottom of the mounting recess ranges 93° to 130°, and a depth of the mounting recess is deeper than 0.01 mm.

In accordance with an embodiment of the present disclosure, the illuminating module is not disposed on the lateral surface of the lens barrel.

In accordance with an embodiment of the present disclosure, a radius of the illuminating module is not greater than a radius of the lens barrel.

In accordance with an embodiment of the present disclosure, at least one receded plane is defined by a circumferential lateral surface of one of the lenses closest to the incident surface, the receded plane and an inner wall of the lens barrel together define an opening, and the light source is disposed against the receded plane.

In accordance with a further embodiment of the present disclosure, a cutting site of a running gate portion of the lens closest to the incident surface is located at the receded plane.

In accordance with an embodiment of the present disclosure, a plurality of protrusions are disposed on the incident surface of the lens assembly and adjacent to a circumference of the incident surface, and the light source is disposed between two of the protrusions.

In accordance with a further embodiment of the present disclosure, a height of the protrusions is not smaller than a thickness of the light source.

To achieve the above object, an aspect of an embodiment of the present disclosure provides a camera module for forming an optical image of an object, including:

a lens assembly including:
a plurality of lenses; and
a lens barrel disposed around the lenses for supporting the lenses;
wherein the lens assembly includes:
an incident surface through which light from the object enters the lens barrel;
an emergent surface through which the light from the object enters the lens barrel; and
a lateral surface parallel to a central axis of the barrel;
wherein the lens barrel includes:
a peripheral wall which extends along the central axis from the incident surface to the emergent surface, and surrounds the central axis to define a receiving chamber, wherein the lenses are sequentially disposed in the receiving chamber along the central axis of the lens barrel, and the peripheral wall laterally supports the lenses; and
a bearing part being parallel to the lenses, wherein the bearing part is disposed on the emergent surface of the lens assembly and is not disposed on the incident surface of the lens assembly; and
an illuminating module disposed on the incident surface of the lens assembly and including:
a plurality of light sources configured for generating light, and
an annular circuit board supporting the light sources and electrically connecting the light sources;
wherein the annular circuit board is coaxial with the lens barrel.

In accordance with an embodiment of the present disclosure, a part of the illuminating module is disposed on a part of a surface of the lens closest to the incident surface, and the part of the surface is adjacent to a circumference of the lens closest to the incident surface.

In accordance with an embodiment of the present disclosure, a part of the illuminating module is disposed in a mounting recess of the lens closest to the incident surface, and the mounting recess is adjacent to a circumference of the lens closest to the incident surface.

In accordance with a further embodiment of the present disclosure, an angle between a side wall and a bottom of the mounting recess ranges from 93° to 130°, and a depth of the mounting recess is deeper than 0.01 mm.

In accordance with an embodiment of the present disclosure, the illuminating module is not disposed on the lateral surface of the lens barrel.

In accordance with an embodiment of the present disclosure, a radius of the illuminating module is not greater than a radius of the lens barrel.

In accordance with an embodiment of the present disclosure, at least one receded plane is defined by a circumferential lateral surface of the lens closest to the incident surface, the receded plane and an inner wall of the lens barrel together define an opening, and one of the light sources is disposed against the receded plane.

In accordance with a further embodiment of the present disclosure, a cutting site of a running gate portion of the lens closest to the incident surface is located at the receded plane.

In accordance with an embodiment of the present disclosure, a plurality of protrusions are disposed on the incident surface of the lens assembly and adjacent to a circumference of the incident surface, and each of the light sources is disposed between two of the protrusions.

In accordance with a further embodiment of the present disclosure, a height of the protrusions is not smaller than a thickness of the light sources.

In summary, in order to improve the limitations of the existing design, the camera module provided by the present disclosure can be miniaturized and wide-angled by an innovative design of the lens assembly and the lenses. In order to facilitate the bearing of the illuminating module, the bearing part originally used for bearing the lens closest to the incident surface is moved to the emergent surface (near an image sensor) from the incident surface, for making room near the lens closest to the incident surface for bearing the illuminating module. Since the bearing part is not present on the incident surface, the height of the illuminating module protruding from the surface of the lens is reduced, and the illuminating module does not significantly affect the viewing angle, thereby making the viewing angle wide. Furthermore, since the illuminating module is not disposed on the lateral surface of the lens assembly, and a radius of the illuminating module is not greater than a radius of the lens assembly, the outer diameter of the entire camera module is not increased. When this structure is in combination with the specific mounting recess or the specific receded planes, the correct relative positions between the light sources and the lens closest to the incident surface can be easily ensured for achieving both the miniaturization of the entire camera module and the wide viewing angle.

BRIEF DESCRIPTION OF DRAWINGS

The foregoing aspects and many of the attendant advantages of this disclosure will become more readily appreciated as the same becomes better understood by reference to the following detailed description, when taken in conjunction with the accompanying drawings, wherein.

DETAILED DESCRIPTION OF PREFERRED EMBODIMENTS

The following description of the embodiments with reference to the accompanying drawings is used to illustrate particular embodiments of the present disclosure. The directional terms used in the present disclosure, such as "upper", "lower", "front", "back", "left", "right", "inner", "outer", "side surface", etc., are only directions with regard to the accompanying drawings. Therefore, the directional terms used for describing and illustrating the present disclosure are not intended to limit the present disclosure.

In the drawings, units with similar structures are indicated by the same reference number.

As to an "embodiment" mentioned herein, the particular features, structures, or characteristics described in this embodiment, which may be described in combination with the embodiment, may be included in at least one embodiment of the present disclosure. The phrases appearing at various locations in the specification do not necessarily refer to the same embodiments, nor to the embodiments being alternative to, mutually exclusive with, or independent from other embodiments. It is explicitly and implicitly understood by a person of ordinary skill in the art that the embodiments described herein may be combined with other embodiments.

The content of the present disclosure is described in detail by reference to embodiments below in conjunction with the accompanying drawings.

Figure 5:
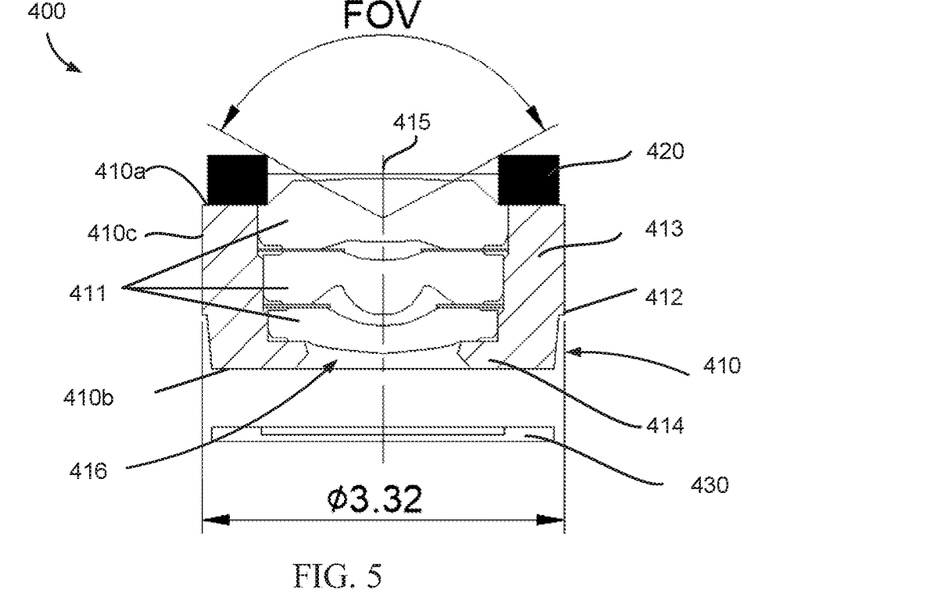
FIG. 5 is a cross-sectional side view illustrating a camera module in accordance with an embodiment of the present disclosure.

By reference to the accompanying drawings, the technological content and embodiments of the present disclosure are described in detail as follows:

Refer to FIG. 5, which is a cross-sectional side view illustrating a camera module 400 in accordance with an embodiment of the present disclosure.

A camera module 400 is provided in the present disclosure for forming an optical image of an object includes a lens assembly 410 and an illuminating module 420. In an embodiment of the present disclosure, the camera module 400 may further include an image sensor 430.

The lens assembly 410 includes a plurality of lenses 411 and a lens barrel 412 disposed around the lenses 411 for supporting the lenses 411.

The lens assembly 410 includes an incident surface 410a, an emergent surface 410b, and a lateral surface 410c. Light from the object enters the lens barrel 412 through the incident surface 410a, and the light from the object exits the lens barrel 412 through the emergent surface 410b. The lateral surface 410c is parallel to a central axis 415 of the lens barrel 412.

The lens barrel 412 includes a peripheral wall 413 and a bearing part 414. The peripheral wall 413 extends along the central axis 415 from the incident surface 410a to the emergent surface 410b, and surrounds the central axis 415 to define a receiving chamber 416. The lenses 411 are sequentially disposed in the receiving chamber 416 along the central axis 415 of the lens barrel 412, and the peripheral wall 413 laterally supports the lenses 411.

The bearing part 414 is parallel to the lenses 411. The bearing part 414 is disposed on the emergent surface 410b of the lens assembly 410 and is not disposed on the incident surface 410a of the lens assembly 410

Figure 6:
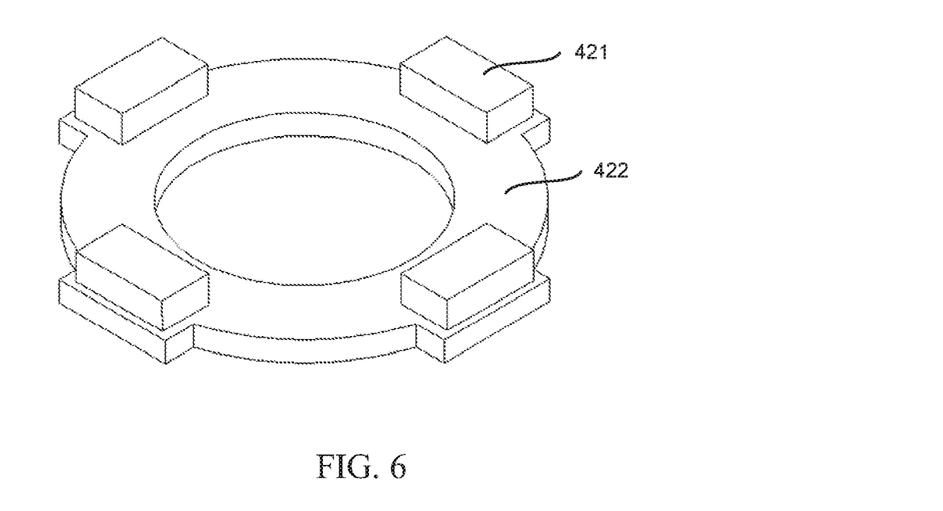
FIG. 6 is a perspective view showing an illuminating module of a camera module according to an embodiment of the disclosure.

Refer to FIG. 6, which is a perspective view showing the illuminating module 420 of the camera module 400 according to an embodiment of the present disclosure.

The illuminating module 420 is disposed on the incident surface 410a of the lens assembly 410 and includes one or more light sources 421 and an annular circuit board 422. Preferably, the illuminating module 420 includes the plurality of light sources 421 configured for generating sufficient light. The annular circuit board 422 supports the light sources 421 and electrically connects the light sources 421 with each other (e.g. via one or more conductive traces). The annular circuit board 422 is coaxial with the lens barrel 412. For example, the light sources 421 are disposed along a circumference of one of the lenses 411 closest to the incident surface 410a. Specifically, the light sources 421 may be light emitting diodes (LEDs), and the annular circuit board 422 may be a flexible printed circuit (FPC). However, other devices may also be used as the light sources 421 or the annular circuit board 422, and the devices configured for realizing the light sources 421 and the annular circuit board 422 should not be regarded as limiting.

In an embodiment of the disposition of the illuminating module 420, a part of the illuminating module 420 is disposed on a part of a surface of the lens 411 closest to the incident surface 410a, and the part of the surface is adjacent to the circumference of the lens 411 closest to the incident surface 410a. In other words, the part of the surface is disposed along the circumference of the lens 411. In an embodiment, the part of the surface is annular and located at the circumference of the lens 411.

Figure 7:
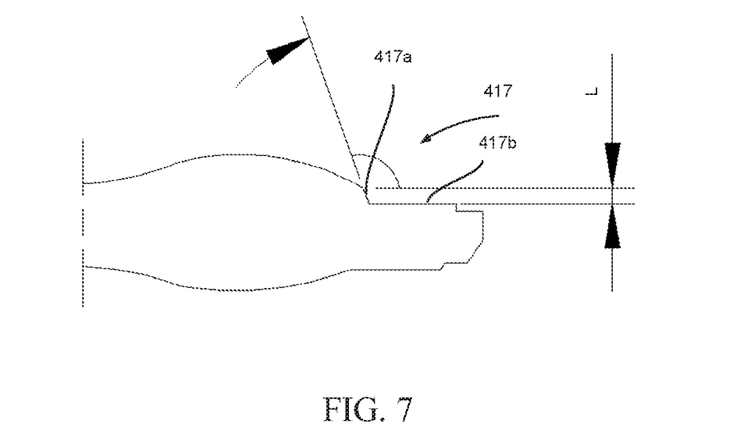
FIG. 7 is a cross-sectional side view illustrating a mounting recess of a camera module in accordance with an embodiment of the present disclosure.

Refer to FIG. 7, which is a cross-sectional side view illustrating a mounting recess 417 of the camera module 400 in accordance with an embodiment of the present disclosure.

In another embodiment of the disposition of the illuminating module 420, a part of the illuminating module 420 is disposed in the mounting recess 417 of the lens 411 closest to the incident surface 410a, wherein the mounting recess 417 is adjacent to a circumference of the lens 411 closest to the incident surface 410a. In other words, the mounting recess 417 is disposed along the circumference of the lens 411. In an embodiment, the mounting recess 417 is annular and located at the circumference of the lens 411, for accurately placing the illuminating module 420 in the correct position, and making the illuminating module 420 be coaxial with the lenses 411, without increasing an outer diameter of the camera module 400 and affecting the viewing angle. In a specific example, an angle between a side wall 417a and a bottom 417b of the mounting recess 417 ranges from 93° to 130°, and a depth of the mounting recess 417 is deeper than 0.01 mm. In an example, the LED types used as the light sources 421 may be type 0201 (0.65 mm×0.35 mm×0.2 mm), or other specifications of Min LEDs or Micro LEDs. However, other types of LEDs may also be used as the light sources 421, and the LED types configured for realizing the light sources 421 should not be regarded as limiting.

Figure 8:
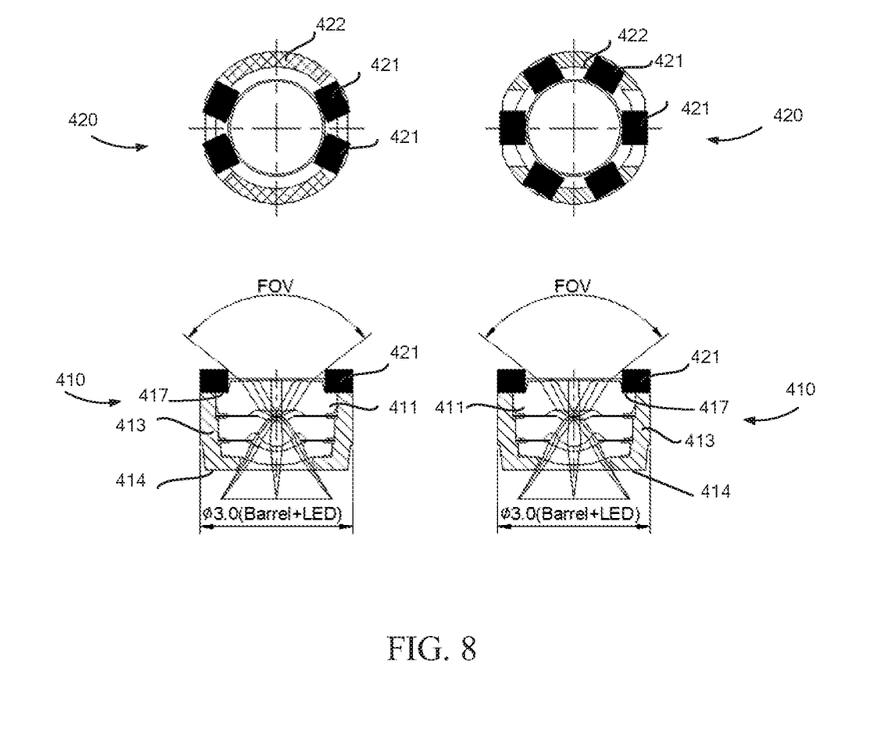
FIG. 8 is two cross-sectional side views and two top views illustrating a camera module having four and six light sources, respectively, in accordance with an embodiment of the present disclosure.

A miniature camera module has limited space for loading the light sources. In an example, the camera module 400 in the present disclosure may have an arrangement of 2 or more LEDs (0201), such as 4 LEDs or 6 LEDs, as shown in FIG. 8. However, other numbers of LEDs can also be used, and the number of the light sources 421 should not be regarded as limiting.

In summary, in order to improve limitations of the existing design, the camera module provided by the present disclosure can be miniaturized and wide-angled by an innovative design of the lens assembly 410 and the lenses 411. In order to facilitate the bearing of the illuminating module, the bearing part 414 originally used for bearing the lens 411 closest to the incident surface 410a is moved to the emergent surface 410b (near the image sensor 430) from the incident surface 410a, for making room near the lens 411 closest to the incident surface 410a for bearing the illuminating module 420. Since the bearing part 414 is not present on the incident surface 410a, the height of the illuminating module 420 protruding from the surface of the lens 411 is reduced, and the illuminating module 420 does not significantly affect the viewing angle, thereby making the viewing angle wide. Furthermore, since the illuminating module 420 is not disposed on the lateral surface 410c of the lens assembly 410, and a radius of the illuminating module 420 is not greater than a radius of the lens assembly 410, the outer diameter of the entire camera module 400 is not increased. When this structure is in combination with the specific mounting recess 417 (as shown in FIG. 7 and FIG. 8), the correct relative positions between the light sources 421 and the lens 411 closest to the incident surface 410a can be easily ensured for achieving both the miniaturization of the entire camera module and the wide viewing angle. As shown in Table 1, the camera module 400 in accordance with the aforementioned designs in FIG. 5-FIG. 7 can effectively control the outer diameter and achieve the miniaturization.

TABLE 1

| Type | Sensor Optical Format | Field of view, (FOV) | Effective Focal Length, (EFL) | Total Track Length, (TTL) | Outside Diameter, (OD) |
| --- | --- | --- | --- | --- | --- |
| 1 | 1/9" | 104.2° | 0.917 | 3.05 | 2.8 |
| 2 | 1/11" | 123° | 0.777 | 2.36 | 2.8 |
| 3 | 1/9" | 140.7° | 0.610 | 2.28 | 2.8 |

Figure 9:
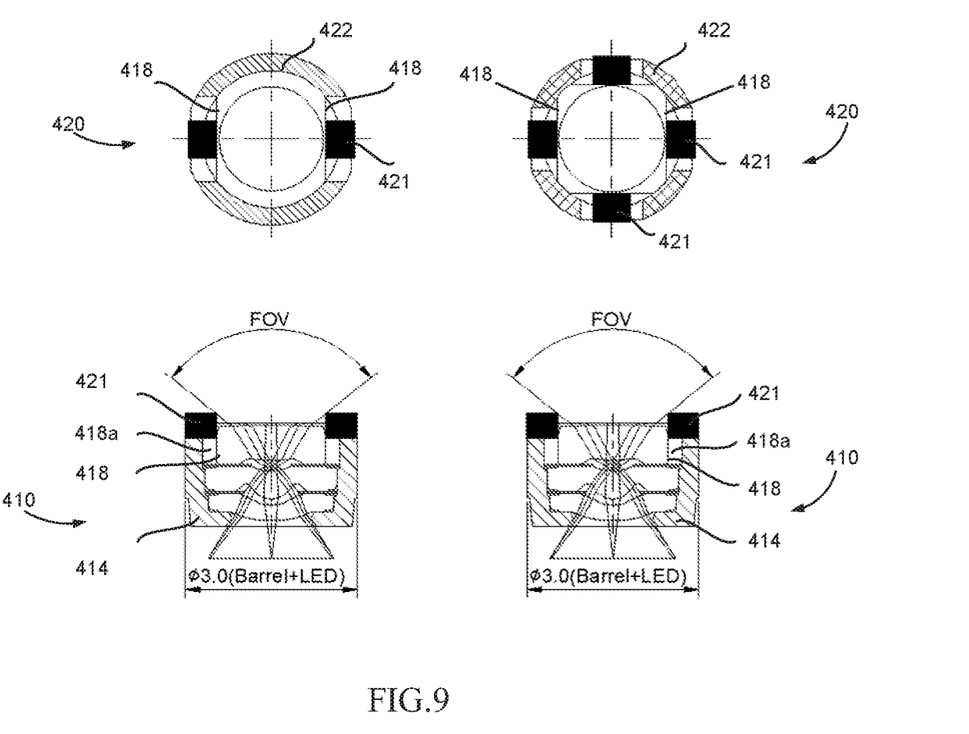
FIG. 9 is two cross-sectional side views and two top views illustrating a camera module having two and four light sources and receded planes, respectively, in accordance with another embodiment of the present disclosure.
Figure 10:
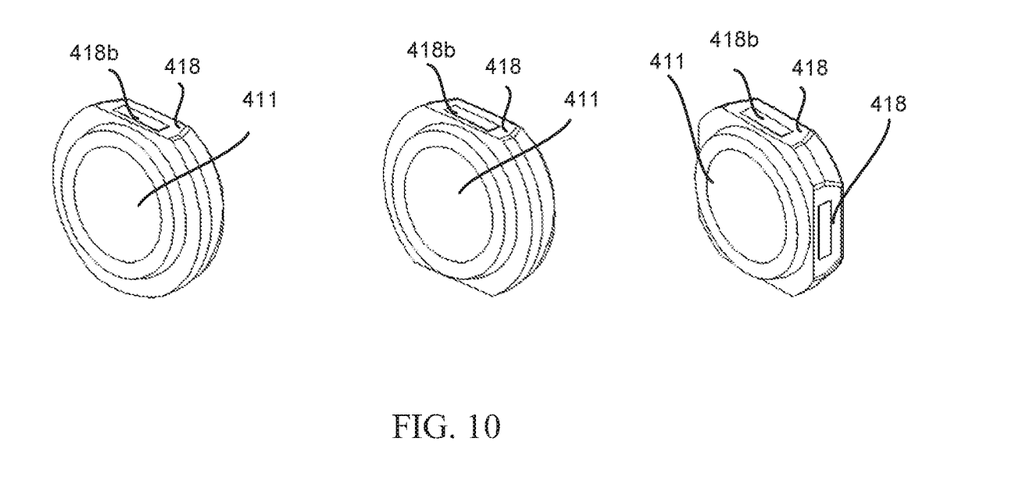
FIG. 10 is a perspective view illustrating three lenses, which respectively have one, two and four receded planes, in a camera module in accordance with another embodiment of the present disclosure.

Refer to FIG. 9, which is two cross-sectional side views and two top views illustrating the camera module 400 having two and four light sources 421 and receded planes 418, respectively, in accordance with another embodiment of the present disclosure. Refer to FIG. 10, which is a perspective view illustrating three lenses 411, which respectively have one, two and four receded planes 418, in the camera module 400 in accordance with another embodiment of the present disclosure.

In another embodiment of the disposition of the illuminating module 420, at least one receded plane 418, also known as a D-cut feature plane, is defined by a circumferential lateral surface of the lens closest to the incident surface 410a, the receded plane 418 and an inner wall of the lens barrel 412 together define an opening 418a, and one of the light sources 421 is disposed against the receded plane, thereby disposing the illuminating module 420 and reducing the outer diameter of the camera module 400, as shown in FIG. 9. A number of the receded planes 418 are disposed based upon the number of the light sources 421. In an example, the camera module 400 in the present disclosure may have an arrangement of 2 or more receded planes 418, such as 4 D-cut feature planes 418 or 6 D-cut feature planes 418, as shown in FIG. 9. However, other numbers of the D-cut feature planes 418 can also be used, and the number of the receded planes 418 should not be regarded as limiting.

Moreover, in the lens forming process, a running gate 418b is the inlet for the plastic fluid. After the forming and cooling processes, the running gate is cut off, and a cutting plane is caused. The cutting plane of the running gate 418b can be used as the receded plane 418. That is, a cutting site of a running gate portion 418b of the lens 411 closest to the incident surface 410a is located at the receded plane 418, as shown in FIG. 10.

Figure 11:
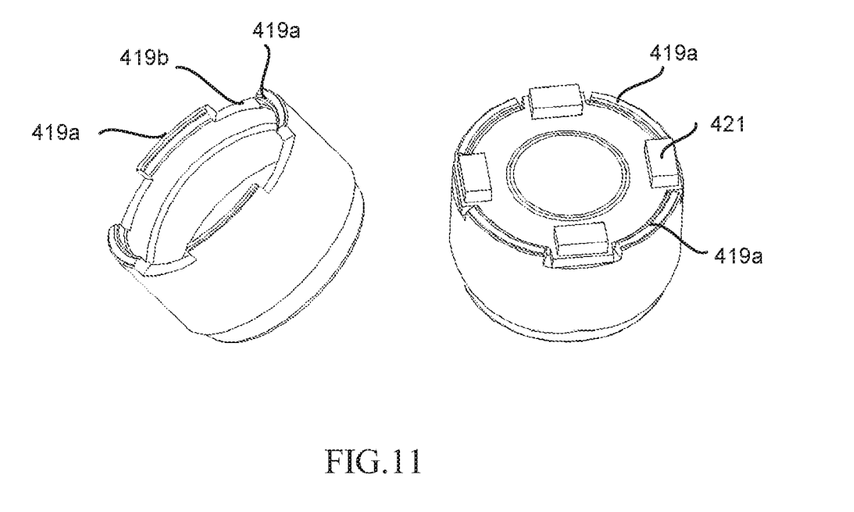
FIG. 11 is a perspective view illustrating a lens barrel having a plurality of protrusions in a camera module in accordance with an embodiment of the present disclosure.

Refer to FIG. 11, which is a perspective view illustrating the lens barrel 412 having a plurality of protrusions 419a in the camera module 400 in accordance with an embodiment of the present disclosure.

In an embodiment of the present disclosure, the plurality of protrusions 419a are disposed on the incident surface 410a of the lens assembly 410 and adjacent to a circumference of the incident surface 410a. In other words, the protrusions 419a are disposed along the circumference of the incident surface 410a. Each of the light sources 421 is disposed between two of the protrusions 419a. Preferably, a height of the protrusions 419a is not smaller than a thickness of the light source 421. More preferably, the height of the protrusions 419a is greater than the thickness of the light source 421. In another embodiment of the present disclosure, a plurality of depressions 419b are defined by the incident surface 410a of the lens assembly 410 and adjacent to a circumference of the incident surface 410a. In other words, the depressions 419b are defined along the circumference of the incident surface 410a. Each of the light sources 421 is disposed in one of the depressions 419b. Preferably, a depth of the depressions 419b is not smaller than the thickness of the light source 421. More preferably, the depth of the depressions 419b is greater than the thickness of the light source 421. The light sources 421, such as LEDs, are protected by controlling heights of the protrusions 419a or depths of the depressions 419b for preventing the top of the illuminating module 400 from being squeezed by other components during assembly, thereby causing damage or abnormality to the LEDs.

In an embodiment of the present disclosure, the camera module 400 further includes an image sensor 430. The image sensor 430 is positioned near the emergent surface 410b of the lens assembly 410 and configured for receiving the optical image of the object formed by the lenses 411. In some embodiments, the image sensor 430 may be a charged-coupled device (CCD), or a complementary metal-oxide-semiconductor transistor (CMOS). The image sensor 430 is configured to convert light signals into electrical signals. The image sensor 430 is one selected from the group consisting of a ceramic leaded chip carrier package type image sensor, a plastic leaded chip carrier package type image sensor and a chip scale package type image sensor. However, various types of the image sensor 430 are only examples, and should not be regarded as limiting.

In summary, in order to improve the limitations of the existing design, the camera module provided by the present disclosure can be miniaturized and wide-angled by an innovative design of the lens assembly 410 and the lenses 411. In order to facilitate the bearing of the illuminating module, the bearing part 414 originally used for bearing the lens 411 closest to the incident surface 410a is moved to the emergent surface 410b (near the image sensor 430) from the incident surface 410a, for making room near the lens 411 closest to the incident surface 410a for bearing the illuminating module 420. Since the bearing part 414 is not present on the incident surface 410a, the height of the illuminating module 420 protruding from the surface of the lens 411 is reduced, and the illuminating module 420 does not significantly affect the viewing angle, thereby making the viewing angle wide. Furthermore, since the illuminating module 420 is not disposed on the lateral surface 410c of the lens assembly 410, and a radius of the illuminating module 420 is not greater than a radius of the lens assembly 410, the outer diameter of the entire camera module 400 is not increased. When this structure is in combination with the specific mounting recess 417 (as shown in FIG. 7 and FIG. 8) or the specific receded planes 418 (as shown in FIG. 9 and FIG. 10), the correct relative positions between the light sources 421 and the lens 411 closest to the incident surface 410a can be easily ensured for achieving both the miniaturization of the entire camera module and the wide viewing angle.

The present disclosure has been described with a preferred embodiment thereof and it is understood that various modifications, without departing from the spirit of the present disclosure, are in accordance with the embodiments of the present disclosure. Hence, the embodiments described are intended to cover the modifications within the scope and the spirit of the present disclosure, rather than to limit the present disclosure.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A camera module comprising:
a lens assembly including a plurality of lenses and a lens barrel disposed around the lenses for supporting the lenses, wherein the lens assembly includes an incident surface, an emergent surface and a lateral surface;
wherein the lens barrel includes a bearing part parallel to the lenses, and the bearing part is disposed on the emergent surface of the lens assembly and is not disposed on the incident surface of the lens assembly; and
an illuminating module including at least one light source and an annular circuit board, and disposed on the incident surface of the lens assembly, wherein a part of the illuminating module is disposed on a part of a surface of one of the lenses closest to the incident surface, and the part of the surface of the lenses closest to the incident surface is adjacent to a circumference of the lens closest to the incident surface.

2. The camera module as claimed in claim 1, wherein a part of the illuminating module is disposed in a mounting recess of one of the lenses closest to the incident surface, and the mounting recess is adjacent to a circumference of the lens closest to the incident surface.

3. The camera module as claimed in claim 2, wherein an angle between a side wall and a bottom of the mounting recess ranges 93° to 130°, and a depth of the mounting recess is deeper than 0.01 mm.

4. The camera module as claimed in claim 1, wherein the illuminating module is not disposed on the lateral surface of the lens assembly.

5. The camera module as claimed in claim 1, wherein a radius of the illuminating module is not greater than a radius of the lens assembly.

6. The camera module as claimed claim 1, wherein at least one receded plane is defined by a circumferential lateral surface of one of the lenses closest to the incident surface, the receded plane and an inner wall of the lens barrel together define an opening, and the light source is disposed against the receded plane.

7. The camera module as claimed in claim 6, wherein a cutting site of a running gate portion of the lens closest to the incident surface is located at the receded plane.

8. The camera module as claimed in claim 1, wherein a plurality of protrusions are disposed on the incident surface of the lens assembly and adjacent to a circumference of the incident surface, and the light source is disposed between two of the protrusions.

9. The camera module as claimed in claim 8, wherein a height of the protrusions is not smaller than a thickness of the light source.

10. A camera module for forming an optical image of an object, comprising:
a lens assembly including:
a plurality of lenses; and
a lens barrel disposed around the lenses for supporting the lenses;
wherein the lens assembly includes:
an incident surface through which light from the object enters the lens barrel;
an emergent surface through which the light from the object enters the lens barrel; and
a lateral surface parallel to a central axis of the barrel;
wherein the lens barrel includes:
a peripheral wall which extends along the central axis from the incident surface to the emergent surface, and surrounds the central axis to define a receiving chamber, wherein the lenses are sequentially disposed in the receiving chamber along the central axis of the lens barrel, and the peripheral wall laterally supports the lenses; and
a bearing part being parallel to the lenses, wherein the bearing part is disposed on the emergent surface of the lens assembly and is not disposed on the incident surface of the lens assembly; and
an illuminating module disposed on the incident surface of the lens assembly and including:
a plurality of light sources configured for generating light, and
an annular circuit board supporting the light sources and electrically connecting the light sources;
wherein the annular circuit board is coaxial with the lens barrel, a part of the illuminating module is disposed on a part of a surface of one of the lenses closest to the incident surface, and the part of the surface of the lenses closest to the incident surface is adjacent to a circumference of the lens closest to the incident surface.

11. The camera module as claimed in claim 10, wherein a part of the illuminating module is disposed in a mounting recess of the lens closest to the incident surface, and the mounting recess is adjacent to a circumference of the lens closest to the incident surface.

12. The camera module as claimed in claim 11, wherein an angle between a side wall and a bottom of the mounting recess ranges from 93° to 130°, and a depth of the mounting recess is deeper than 0.01 mm.

13. The camera module as claimed in claim 10, wherein the illuminating module is not disposed on the lateral surface of the lens barrel.

14. The camera module as claimed in claim 10, wherein a radius of the illuminating module is not greater than a radius of the lens barrel.

15. The camera module as claimed claim 10, wherein at least one receded plane is defined by a circumferential lateral surface of the lens closest to the incident surface, the receded plane and an inner wall of the lens barrel together define an opening, and one of the light sources is disposed against the receded plane.

16. The camera module as claimed in claim 15, wherein a cutting site of a running gate portion of the lens closest to the incident surface is located at the receded plane.

17. The camera module as claimed in claim 10, wherein a plurality of protrusions are disposed on the incident surface of the lens assembly and adjacent to a circumference of the incident surface, and each of the light sources is disposed between two of the protrusions.

18. The camera module as claimed in claim 17, wherein a height of the protrusions is not smaller than a thickness of the light sources.

\* \* \* \* \*